United States Patent
Kobayashi et al.

(10) Patent No.: US 7,813,921 B2
(45) Date of Patent: Oct. 12, 2010

(54) SPEECH RECOGNITION DEVICE AND SPEECH RECOGNITION METHOD

(75) Inventors: Hajime Kobayashi, Tsurugashima (JP); Soichi Toyama, Tsurugashima (JP); Yasunori Suzuki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 980 days.

(21) Appl. No.: 11/547,322

(22) PCT Filed: Mar. 15, 2005

(86) PCT No.: PCT/JP2005/005052
§ 371 (c)(1),
(2), (4) Date: Dec. 5, 2006

(87) PCT Pub. No.: WO2005/098820
PCT Pub. Date: Oct. 20, 2005

(65) Prior Publication Data
US 2008/0270127 A1    Oct. 30, 2008

(30) Foreign Application Priority Data
Mar. 31, 2004   (JP) .............................. 2004-102904

(51) Int. Cl.
*G10L 21/02*   (2006.01)
(52) U.S. Cl. ................... 704/226; 704/228; 704/234; 704/253; 704/233; 381/94.7; 381/94.3; 381/57; 381/97
(58) Field of Classification Search ........... 704/233, 704/226–228, 232, 234, 219, 253, 256; 381/94.7, 381/94.3, 57, 97
See application file for complete search history.

(56) References Cited

U.S. PATENT DOCUMENTS 4,811,404 A * 3/1989 Vilmur et al. .............. 381/94.3
(Continued)

FOREIGN PATENT DOCUMENTS

EP    1 189 205 A1    3/2002
(Continued)

OTHER PUBLICATIONS

Pellom et al., ("An improved (Auto:I, LSP:T) Constrained Iterative Speech Enhancement for Colored Noise Environments", IEEE transactions On Speech and Audio Signal Processing, vol. 6, No. 6, Nov. 1998).*

(Continued)

*Primary Examiner*—Vijay B Chawan
(74) *Attorney, Agent, or Firm*—Sughrue Mion, PLLC

(57) ABSTRACT

There is provided a voice recognition device and a voice recognition method that enhance the function of noise adaptation processing in voice recognition processing and reduce the capacity of a memory being used. Acoustic models are subjected to clustering processing to calculate the centroid of each cluster and the differential vector between the centroid and each model, model composition between each kind of assumed noise model and the calculated centroid is carried out, and the centroid of each composition model and the differential vector are stored in a memory. In the actual recognition processing, the centroid optimal to the environment estimated by the utterance environmental estimation is extracted from the memory, model restoration is carried out on the extracted centroid by using the differential vector stored in the memory, and noise adaptation processing is executed on the basis of the restored model.

9 Claims, 9 Drawing Sheets

U.S. PATENT DOCUMENTS

| | | | |
|---|---|---|---|
| 6,188,982 | B1 | 2/2001 | Chiang |
| 6,438,513 | B1* | 8/2002 | Pastor et al. ............... 702/191 |
| 6,615,170 | B1* | 9/2003 | Liu et al. .................. 704/233 |
| 6,741,873 | B1* | 5/2004 | Doran et al. ............ 455/569.1 |
| 6,766,292 | B1* | 7/2004 | Chandran et al. .......... 704/224 |
| 6,859,420 | B1* | 2/2005 | Coney et al. ............... 367/178 |
| 6,937,980 | B2* | 8/2005 | Krasny et al. .............. 704/231 |
| 6,959,276 | B2* | 10/2005 | Droppo et al. ............. 704/226 |
| 7,047,047 | B2* | 5/2006 | Acero et al. ............... 455/563 |
| 7,165,027 | B2* | 1/2007 | Kellner et al. .............. 704/233 |
| 7,266,494 | B2* | 9/2007 | Droppo et al. ............. 704/228 |
| 2001/0028713 | A1* | 10/2001 | Walker ...................... 379/416 |
| 2003/0040908 | A1* | 2/2003 | Yang et al. ................. 704/233 |

FOREIGN PATENT DOCUMENTS

| | | |
|---|---|---|
| EP | 1 345 209 A2 | 9/2003 |
| EP | 1 355 296 A2 | 10/2003 |
| EP | 1400952 A1 | 3/2004 |
| EP | 1 471 500 A1 | 10/2004 |
| JP | 9-258765 A | 10/1997 |
| JP | 10-149191 A | 6/1998 |
| JP | 10-161692 A | 6/1998 |
| JP | 2000-330587 A | 11/2000 |
| JP | 2002-14692 A | 1/2002 |
| JP | 2002-91485 A | 3/2002 |
| JP | 2003-330484 A | 11/2003 |

OTHER PUBLICATIONS

Yao et al., ("Noise Adaptive Speech Recognition with Acoustic Models Trained from Noisy Speech Evaluated on Aurora-2 Database", ICSLP 2002: 7th International Conference on Spoken Language Processing, vol. 4, No. 4, Sep. 2002, pp. 2437-2440).*

Akae et al., "Zatsuon Kankyo eno Jacobi Tekioho no Kakucho", The Acoustical Society of Japan (ASJ) Koen Ronbunshu, 2000 Nen Shunki I, (Mar. 15, 2000), 1-8-4, pp. 7 to 8.

Ida et al., "Zatsuon DB to Model Tekioka o Mochiita HMM Goseiho ni okeru Zatsuon Hendo Taisei no Hyoka", The Acoustical Society of Japan (ASN) Koen Ronbunshu, 2004 Nen Shuki I, (Oct. 2, 2001), 1-1-17, pp. 33 to 34.

Noguchi et al., "1 Channel Nyuryoku Shingochu no Toppatsusei Zatsuon no Hanbetsu to Jokyo", The Acoustical Society of Japan (ASJ) Koen Ronbunshu, 2004 Nen Shunki I, (Mar. 17, 2004) 3-P-30, pp. 655 to 656.

European Search Report.

"Noise Adaptive Speech Recognition With Acoustic Models Trained From Noisy Speech Evaluated on Aurora-2 Database", Kaisheng Yao, et al. ATR Spoken Language Translation Research Laboratories, Kyoto, Japan, ICSLP 2002, vol vol. 4 pp. 2437-2440.

* cited by examiner

SPEECH RECOGNITION DEVICE AND SPEECH RECOGNITION METHOD

TECHNICAL FIELD

The present invention relates to a voice recognition device, a voice recognition method, etc. for recognizing uttered voice, for example.

BACKGROUND ART

In order to enhance practicability of voice recognition processing, it is important to enhance not only a recognition technique for uttered voice itself, but also a processing technique for environmental noises superposed on the uttered voice. A so-called noise adaptation processing technique for enhancing the resistance property to environmental noises and thus enhancing practicability of voice recognition processing has been hitherto developed, and for example, techniques as disclosed in Patent Document 1 or Non-patent document 1 have been disclosed.

In the former case, distributions of acoustic models (hereinafter merely referred to as "distributions") are classified by a predetermined number of groups (hereinafter referred to as "clusters"). Specifically, clustering processing is executed so that a plurality of similar distributions are allocated to the same group, and a predetermined number of clusters are generated. Then, model composition processing is executed on the centroid of each cluster.

Therefore, as compared with a generally-known model composition processing, it is impossible to carry out model composition at a higher speed. However, the amount of calculation required for model composition processing on one distribution is large, and for example when it is applied to so-called built-in equipment such as a car navigation device or the like on the assumption that the performance thereof is kept, installation into equipment may be difficult because of restriction in processing time and equipment mount space.

On the other hand, in the latter case, plural noise models for various noise environment categories are prepared in a memory in advance, and a noise model adaptive to a noise environmental category of a voice input signal is selected, whereby the noise adaptation processing corresponding to the noise environment can be performed. However, when the numbers of noise environmental categories and noise models to be prepared in advance are increased, the memory capacity required to store these information is rapidly increased. Therefore, it is difficult to use this voice recognition device as a built-in type voice recognition device which is installed in mobile equipment or in-vehicle mount type equipment.

[Patent Document 1] Japanese Patent Kokai No. 10-161692

[Non-patent Document 1] Papers of lectures of Acoustical Society of Japan (1-8-4; March in 2000) "EXPANSION OF JACOBI ADAPTATION TO NOISE ENVIRONMENTS" (Toshihiko Akae and other three persons)

DISCLOSURE OF THE INVENTION

Among the objects of the present invention, an example is to provide a voice recognition device and a voice recognition method that can enhance a noise adaptation processing function in voice recognition processing and reduce the capacity of a memory being used.

According to the invention recited in claim 1, a voice recognition device for executing noise adaptation processing based on a noise model on an input voice signal to carry out voice recognition on the input voice signal is characterized by comprising: first storage means for calculating a first parameter representative of plural noise models contained in each of plural noise environmental categories in advance and storing the first parameter every noise environmental category; second storage means for calculating a second parameter representing relative positional information between each of the plural noise models and the first parameter in advance and storing the second parameter; estimating means for estimating, on the basis of the characteristic of an environmental noise superposed by the input voice signal, a noise environmental category to which the environmental noise concerned belongs; selecting means for selecting and extracting the first parameter corresponding to a noise environmental category estimated by the estimating means from the first storage means; and noise adaptation means for restoring a noise model adaptive to the environmental noise by using the first parameter extracted by the selecting means and the second parameter read out from the second storage means and executing noise adaptation processing on the input voice signal by using the noise model thus restored.

Furthermore, according to the invention recited in claim 8, a voice recognition method for executing noise adaptation processing based on a noise model on an input voice signal to carry out voice recognition on the input voice signal is characterized by comprising: a step of calculating a first parameter representative of plural noise models contained in each of plural noise environmental categories in advance and storing the first parameter into a first memory every noise environmental category; a step of calculating a second parameter representing relative positional information between each of the plural noise models and the first parameter in advance and storing the second parameter into a second memory; a step of estimating, on the basis of the characteristic of an environmental noise superposed by the input voice signal, a noise environmental category to which the environmental noise concerned belongs; a step of selecting and extracting the first parameter corresponding to an estimated noise environmental category from the first memory ; and a step of restoring a noise model adaptive to the environmental noise by using the selected and extracted first parameter and the second parameter read out from the second memory and executing noise adaptation processing on the input voice signal by using the noise model thus restored.

EMBODIMENTS FOR CARRYING OUT THE INVENTION

Figure 1:
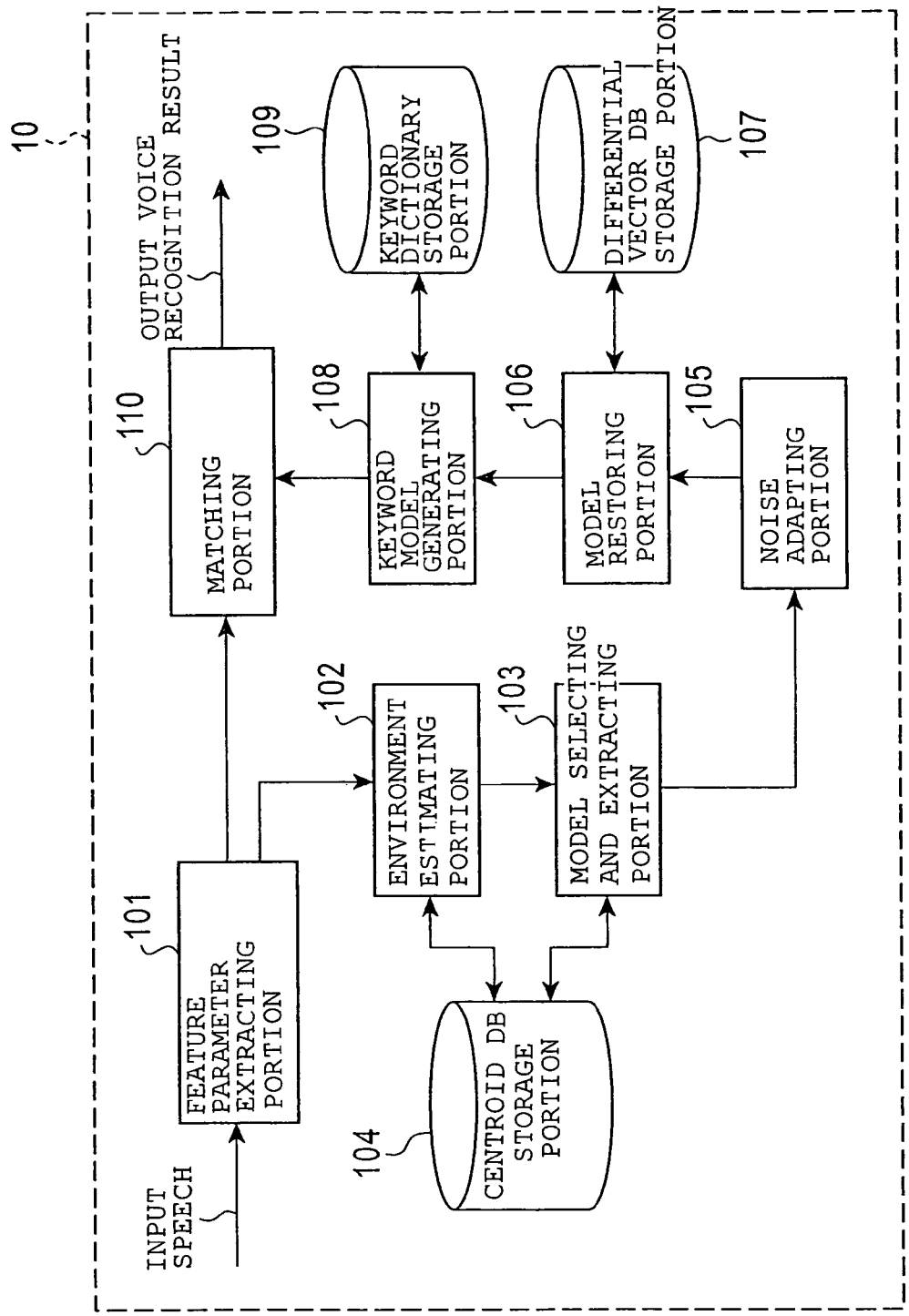
FIG. 1 is a block diagram showing an embodiment of a voice recognition device according to the present invention.

FIG. 1 shows a voice recognition device according to an embodiment of the present invention. The voice recognition device 10 shown in FIG. 1 may be designed so that it is used in an independent style or installed in another device such as a cellular phone, a car navigation device or the like.

In FIG. 1, a feature parameter extracting portion 101 converts an acoustic signal existing in an uttered section and non-uttered sections before and after the uttered section in an input uttered voice signal to a feature parameter representing an acoustic feature of the acoustic signal and extracting the acoustic feature.

An environment estimating portion 102 estimates a environmental category of a noise superposed on the input uttered voice signal on the basis of the feature parameter in the non-uttered sections. With respect to the noise environmental category, for example, in the case of a noise associated with a vehicle, a noise caused by an engine corresponds to one noise category, and a noise associated with a car air conditioner corresponds to one noise category. A model selecting and extracting portion 103 selects and extracts various kinds of data associated with a noise model contained in a category estimated by the environment estimating portion 102 from a centroid data base storage portion 104 (hereinafter merely referred to as "storage portion 104"). A noise adaptation processor 105 executes noise adaptation processing based on the Jacobi Adaptation method or the like by using the selected and extracted various kinds of data, for example.

A model restoring portion 106 executes model restoring processing on the basis of the result of the noise adaptation processing by using a differential vector pre-stored in a differential vector data base storage portion 107 (hereinafter merely referred to as "storage portion 107"). The various kinds of data and the differential vector stored in the storage portion 104 and the storage portion 107 will be described in detail later.

A keyword model generating portion 108 extracts recognition candidates from a vocabulary stored in a keyword dictionary storage portion 109 (hereinafter merely referred to as "storage portion 109") on the basis of the acoustic model output from the model restoring portion 106 and generates a keyword model as an acoustic pattern.

A matching portion 110 applies the feature parameter of the uttered section supplied from the feature parameter extracting portion 101 to each of keyword models generated by the keyword model generating portion 108, and the matching likelihood thereof is calculated to perform voice recognition processing on the input uttered voice signal.

The direction of each arrow indicating the flow of a signal in the block of FIG. 1 represents the flow of each main signal between respective constituent elements, and with respect to various kinds of signals such as response signals appended to the respective signals, monitoring signals, etc., there are signals flowing in the opposite directions to the directions of the arrows. The segmentation of the respective constituent elements and the signal routes shown in FIG. 1 are provided as a matter of convenience to describe the operation, and thus it is unnecessary to implement the illustrated construction in the actual device.

Next, the processing of generating various data such as centroid data and differential vector data which are stored in the storage portion 104 and the storage portion 107 in advance will be described.

In this embodiment, it is necessary to generate the respective data described above in advance and store the data in the respective storage portions as a preparatory step of this embodiment. The aspect of the data generating processing in this preparatory step will be described with reference to the flowchart of FIG. 2.

First, in step S201 of FIG. 2, clustering processing of grouping similar acoustic model distributions (hereinafter referred to as "distribution") is executed on an input acoustic model. The number of groups (hereinafter referred to as "cluster") formed through the clustering processing is preset, and the clustering processing is continued until the number of generated clusters reaches the above fixed number. In step S201, cluster information indicating which cluster each distribution belongs to, etc. is generated simultaneously with the progress of the clustering processing.

In the next step S203, by using all the distributions belonging to each cluster, the centroid of each cluster is calculated. The processing of the centroid calculation will be described as follows. When distributions belonging to one cluster i are represented by m(n) (n=1, 2, . . . , p: p represents the number of distributions belonging to the cluster i) and the centroid calculated is represented by g(i), the centroid g(i) is calculated as follows.

[Equation 1]

$$g(i) = \frac{1}{p}\sum_{n=1}^{p} m(n)$$

When the processing of the step S203 is finished, the difference between the distribution of the distributions belonging to each cluster and the centroid of the cluster is calculated in the next step S205. Specifically, when the distributions belonging to the cluster i are represented by m(n), the centroid of the cluster is represented by g(i) and a differential vector representing the difference concerned is represented by d(n), the differential vector d(n) can be calculated as follows.

$$d(n)=m(n)-g(i)$$

Figure 3:
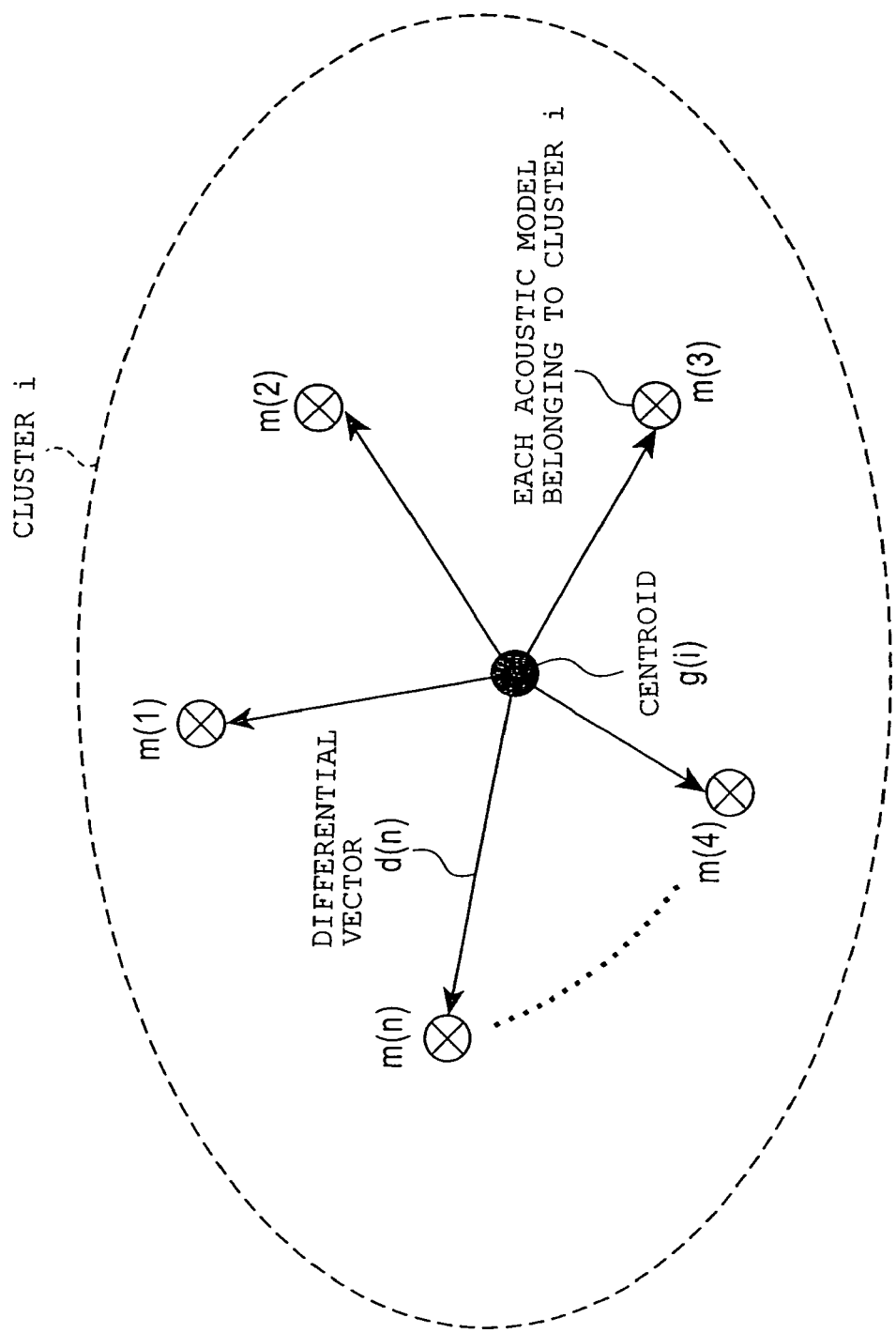
FIG. 3 is a diagram showing the construction of a cluster formed in the processing process of FIG. 2.

The value of the differential vector calculated in step S205 is stored in the storage portion 107 of the voice recognition device 10. The mutual relationship of each distribution m(n) contained in the cluster i, the centroid g(i) of the cluster and the differential vector d(n) is shown in the schematic diagram of the cluster structure of FIG. 3.

Next, a predetermined noise model is prepared in step S207, and model composition processing is executed on the noise model and the centroid of each cluster calculated in step S203. The centroid of each cluster after the model composition is stored in the storage portion 104 of the voice recognition device 10.

In this embodiment, plural noise models are prepared every environmental noise category, and the model composition processing is executed on each noise model. Therefore, post-composition clusters whose number is equal to the number of noise models supplied to the model composition processing are generated from the centroid of one cluster before the model composition processing.

Figure 2:
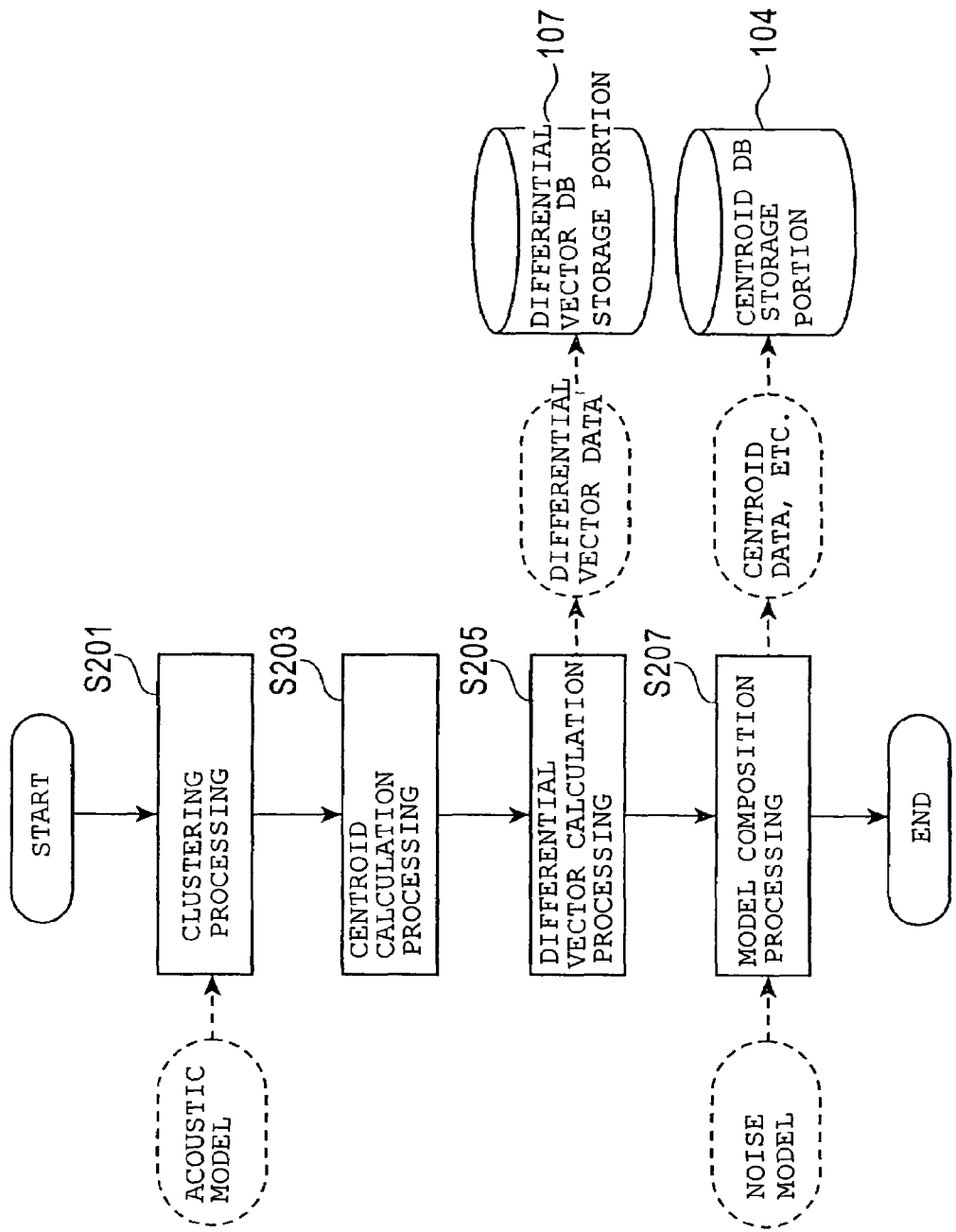
FIG. 2 is a flowchart showing the process of a preparatory step processing in the voice recognition device shown in FIG. 1.
Figure 4:
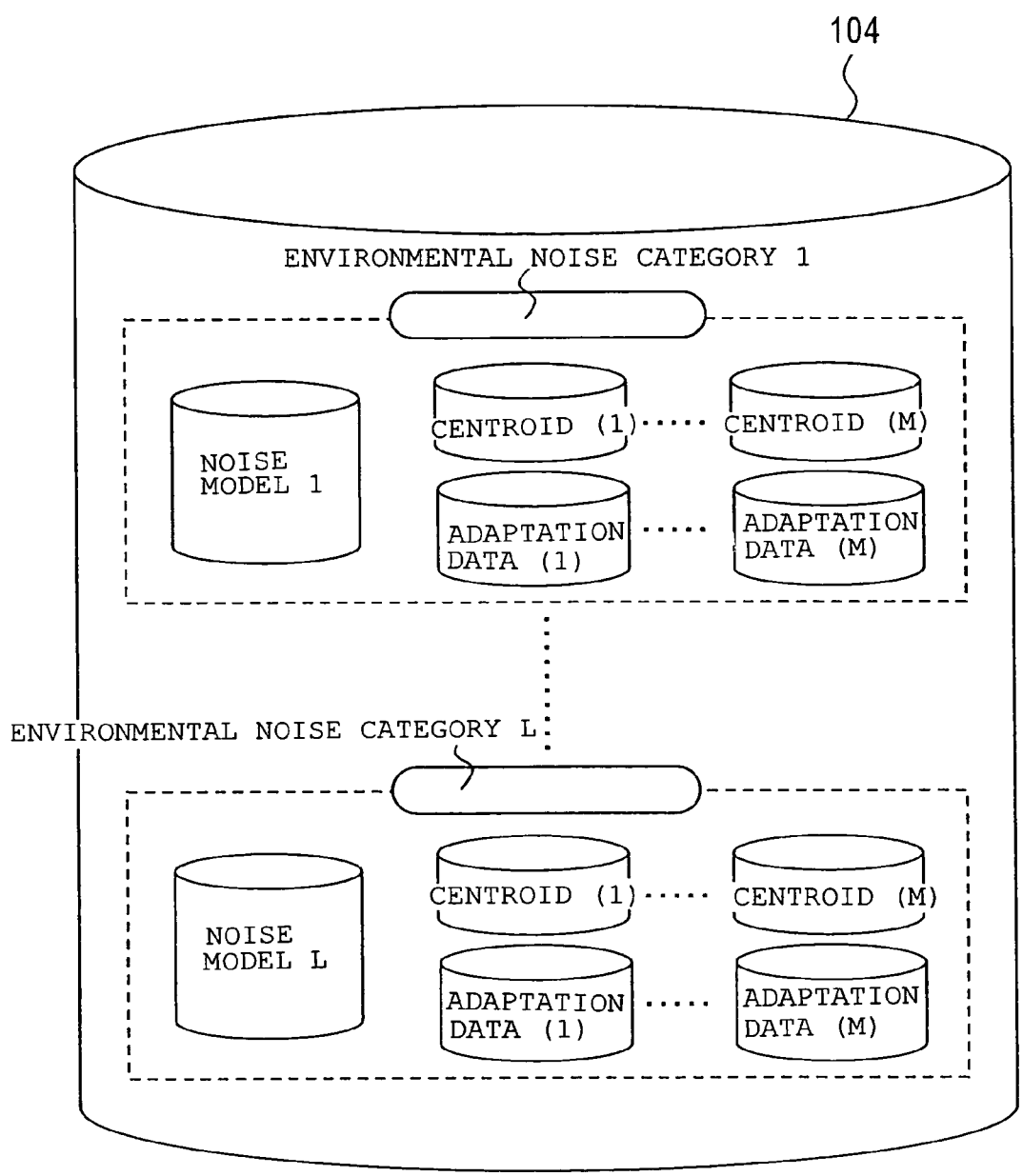
FIG. 4 is a diagram showing the construction of the content of a centroid data base storage portion 104 in the voice recognition device of FIG. 1.

The aspect that various kinds of data calculated through the model composition processing of the step S207 are stored in the storage portion 104 is shown in FIG. 4. As shown in FIG. 4, the following three kinds of data are stored in the storage portion 104 every environmental noise category:

(1) one noise model;

(3) the centroid of a cluster achieved by executing the processing shown in FIG. 2 on one acoustic model; and (2) information corresponding to the centroid of each cluster which is required for noise adaptation processing in the noise adapting portion 105.

Through the processing of the preparatory step described above, the respective predetermined data are stored in advance in the storage portion 104 and the storage portion 107 of the voice recognition device 10 according to this embodiment.

Next, the operation in the voice recognition processing of uttered voice by the voice recognition device 10 will be described with reference to a block diagram of FIG. 1 and a flowchart of FIG. 5.

Figure 5:
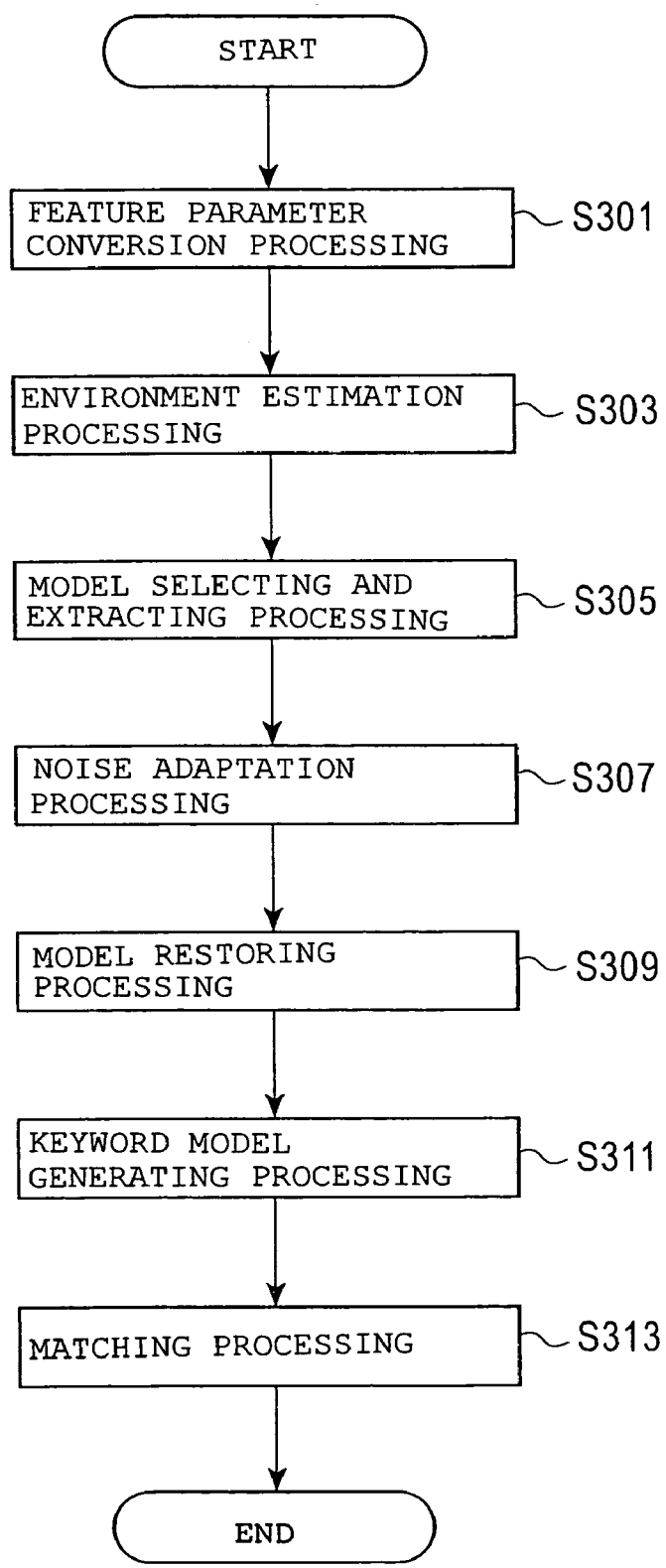
FIG. 5 is a flowchart showing the process of voice recognition processing in the voice recognition device of FIG. 1.

First, when an uttered voice signal is input to the voice recognition device 10, feature parameter conversion processing of step S301 shown in FIG. 5 is executed. That is, the feature parameter extracting portion 101 of the voice recognition device 10 converts an input uttered voice signal to uttered parameters such as LPC cepstrum, MFCC (mel frequency cepstrum coefficient) or the like while containing an uttered section and non-uttered section before and after the uttered section. The type of the uttered parameters to be used is not limited to the above kinds, and any type of parameters may be likewise used insofar as they are parameters representing an acoustic feature of an uttered signal and also the acoustic mode is represented by using the same parameters as the format of these acoustic parameters.

When the feature parameter conversion processing of the step S301 is executed, the feature parameter of the uttered section and the feature parameter of the non-uttered sections are supplied from the feature parameter extracting portion 101 to the matching portion 110 and the environment estimating portion 102, respectively.

The environment estimating processing of the next step S303 is the processing of estimating an environmental noise superposed on an input uttered voice to select a predetermined category from plural environmental noise categories stored in the storage portion 104. That is, the environment estimating portion 102 estimates the environmental noise of the input uttered signal on the basis of the feature parameter of the non-uttered sections, and determined the corresponding noise category. As described above, nose models representative of different environmental noise categories are stored in the data base of the storage portion 104.

The environment estimating portion 102 first calculates the noise likelihood for each noise category on the basis of these noise models and the feature parameter of the non-uttered sections.

These noise models contain the average value and covariance of feature parameters calculated by using the data base of many environmental noises as targets. Accordingly, the noise likelihood of each environmental category can be determined by applying the uttered parameter corresponding to the feature parameter of the non-uttered sections to a normal distribution achieved from the average/dispersion of the noise models.

Figure 6:
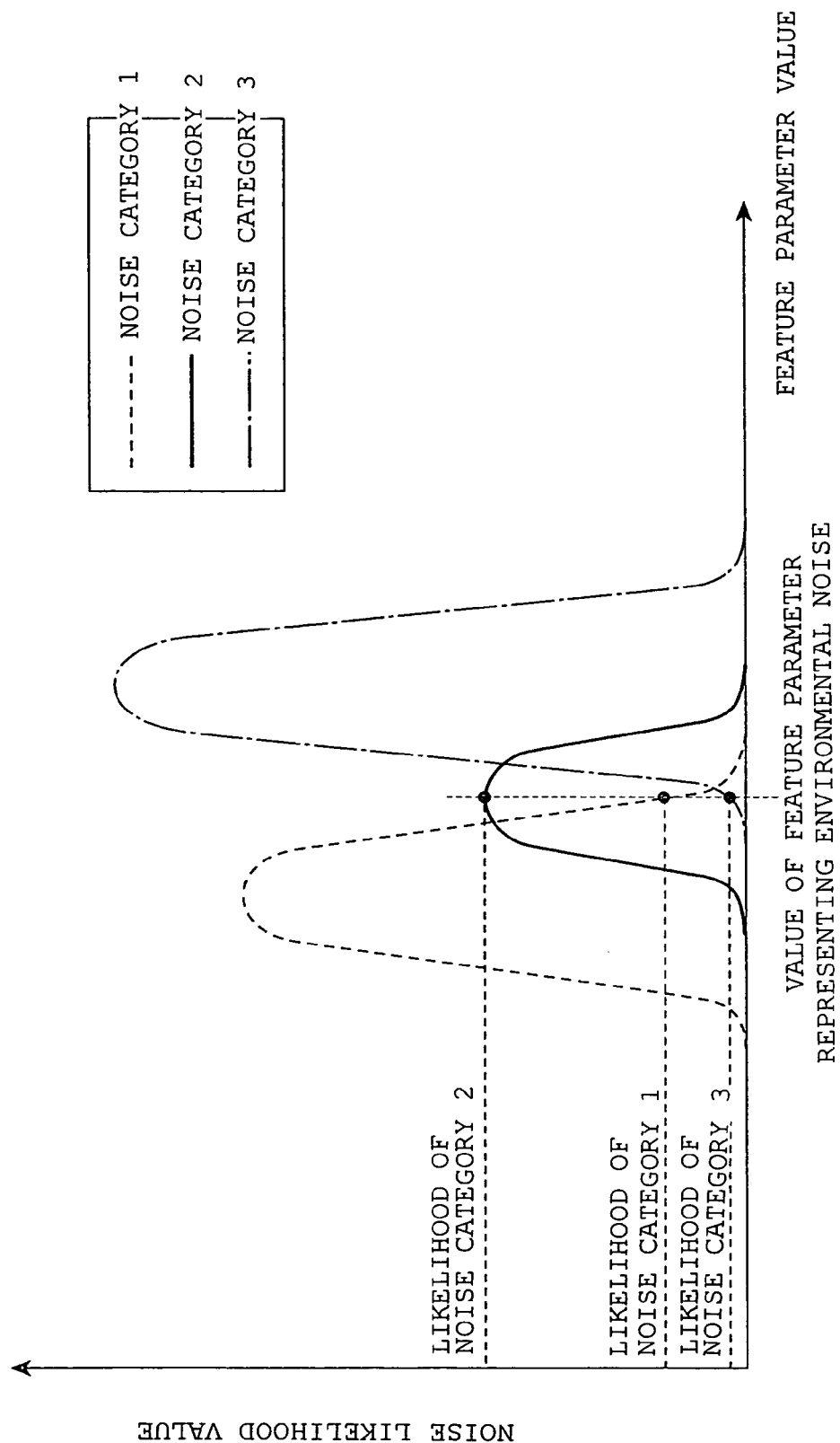
FIG. 6 is a diagram showing an aspect of selecting a noise category in the environmental estimation processing of FIG. 5.

FIG. 6 shows a case where the uttered parameter as the feature parameter of the non-uttered sections is applied to normal distributions of three noise models of noise categories 1 to 3 to determine the noise likelihoods. In the case of FIG. 6, it is shown that when an uttered parameter indicating the environmental noise of an input uttered signal is applied to the noise models of the noise categories 1 to 3, the noise likelihood of the noise category 2 is higher than those of the other two noise categories. Therefore, in FIG. 6, the noise category 2 is selected as an estimation result of the environmental noise category.

When the category of the environmental noise superposed on the input uttered voice is estimated through the environmental estimation processing of the step S303, the selecting and extracting processing of a noise model is executed in the next step S305. That is, the model selecting and extracting portion 103 selects and extracts various kinds of data associated with the noise category estimated by the environment estimating portion 102 from the data base of the storage portion 104.

In the data base of the storage portion 104 are stored the centroid data achieved by executing the clustering processing on the distributions of the acoustic models and combining the centroid of each cluster with the noise model, the noise model concerned and the noise adaptation processing data corresponding to each centroid every environmental noise category as shown in FIG. 4. In step S305, these data belonging to the selected noise category are loaded form the storage portion 104 to the noise adapting portion 105.

In the next step S307, the noise adaptation processing of the noise adapting portion 105 is executed. Various kinds of methods may be used for the noise adaptation processing. For example, when the noise adaptation processing based on the Jacobi adaptation method is executed, Jacobi matrix corresponding to the centroid of each cluster is also stored as a centroid data base in the storage portion 104 in advance. In the stage where the noise adaptation processing of the step S307 is executed, the Jacobi matrix data of the corresponding noise category are read out from the storage portion 104 to the noise adapting portion 105, and the noise adaptation processing based on the Jacobi adaptation method is executed by using the data concerned.

When the noise adaptation processing of the step S307 is finished, in the next step S309, the mode restoring processing of the model restoring portion 106 is executed by using the data of the differential vector prepared in the storage portion 107 in advance. An acoustic model after the noise adaptation is prepared through the above-described processing.

Thereafter, the keyword model generating processing is executed in step S311. In this processing, the keyword model generating portion 108 executes the keyword model generating processing of extracting a vocabulary as a recognition candidate of voice recognition from the storage portion 109, and stereotyping the vocabulary concerned as an acoustic pattern.

In the next step S313, the matching processing of the matching portion 110 is executed. That is, the feature parameter of the uttered section supplied from the feature parameter extracting portion 101 is collated with each of the keyword models generated in the keyword model generating portion 108, and the keyword likelihood indicating the matching degree to each keyword is calculated. The keyword having the highest keyword likelihood among the keyword likelihoods achieved through the above processing is output as a recognition result to the input uttered voice from the voice recognition device 10.

As described above, according to this embodiment, a set of plural initial composition models is converted to plural initial composition clusters and stored, whereby the use capacity of the memory being used can be reduced, and thus a voice recognition device having a higher noise adaptation processing capability can be easily installed in an built-in type equipment. Furthermore, since the clustering in the preparatory step is executed before the model composition is carried out, the differential vector can be made common, and both simplification of the required construction and enhancement in performance can be achieved at the same time.

Furthermore, in a case where a speaker adaptation function is added to this embodiment to carry out speaker adaptation by differential vectors, when the content of the centroid data base is upgraded, speech recognition under an upgraded environment can be performed while the feature of a speaker is reflected.

Figure 7:
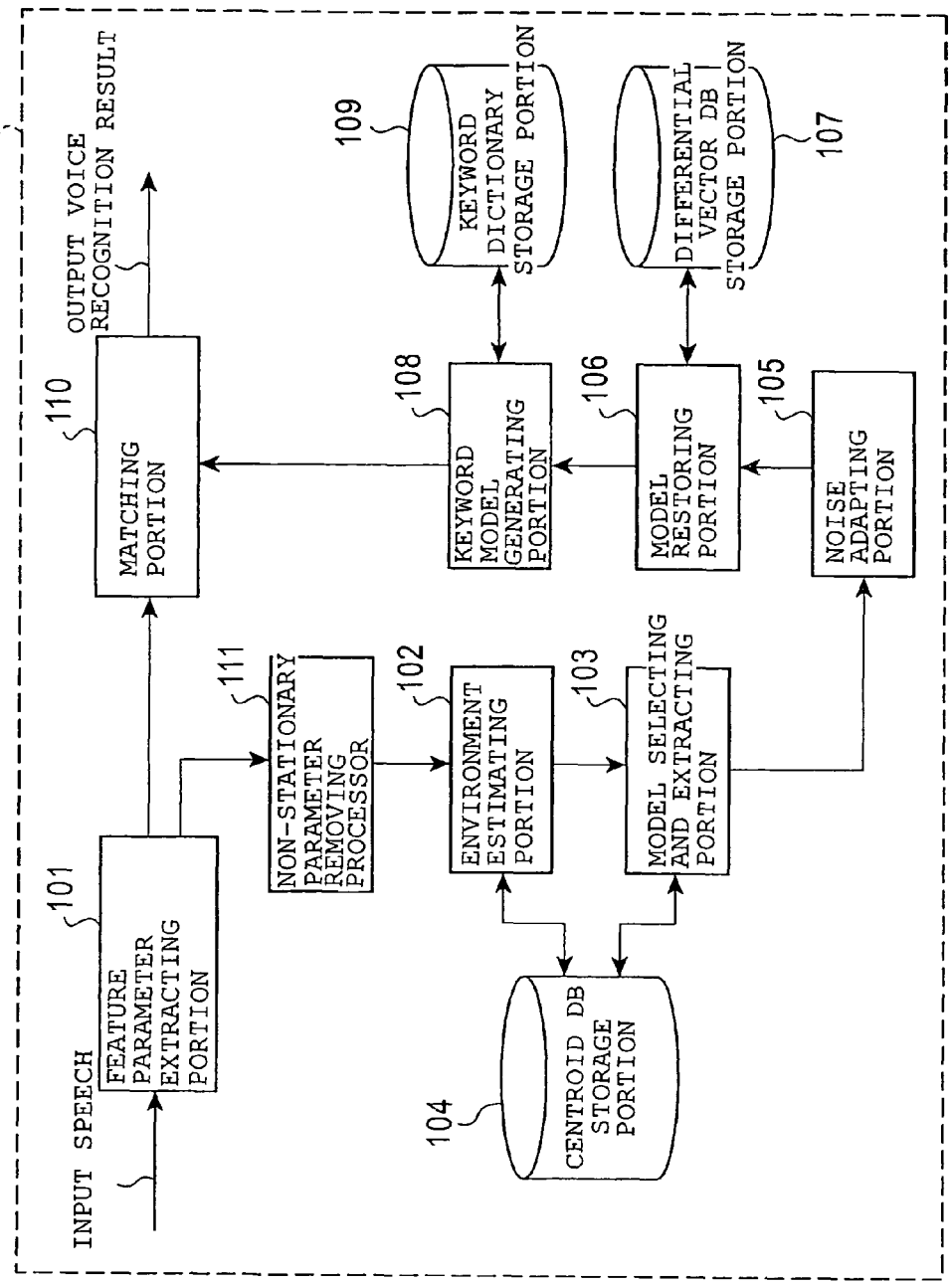
FIG. 7 is a block diagram showing a second embodiment of the voice recognition device according to the present invention.

FIG. 7 is a block diagram showing a second embodiment of the voice recognition device of the present invention.

In FIG. 7, the same constituent elements as the voice recognition device 10 shown in FIG. 1 are represented by the same reference numerals, and the description thereof is not repeated.

A voice recognition device 20 shown in FIG. 7 is characterized in that a non-stationary parameter removing processor 111 is provided between the feature parameter extracting portion 101 and the environment estimating portion 102 in addition to the respective constituent elements of the voice recognition device 10 shown in FIG. 1.

The non-stationary parameter removing processor 111 carries out the operation of removing non-stationary parameters from a set of feature parameters (referred to as noise set) supplied form the feature parameter extracting portion 101.

Figure 8:
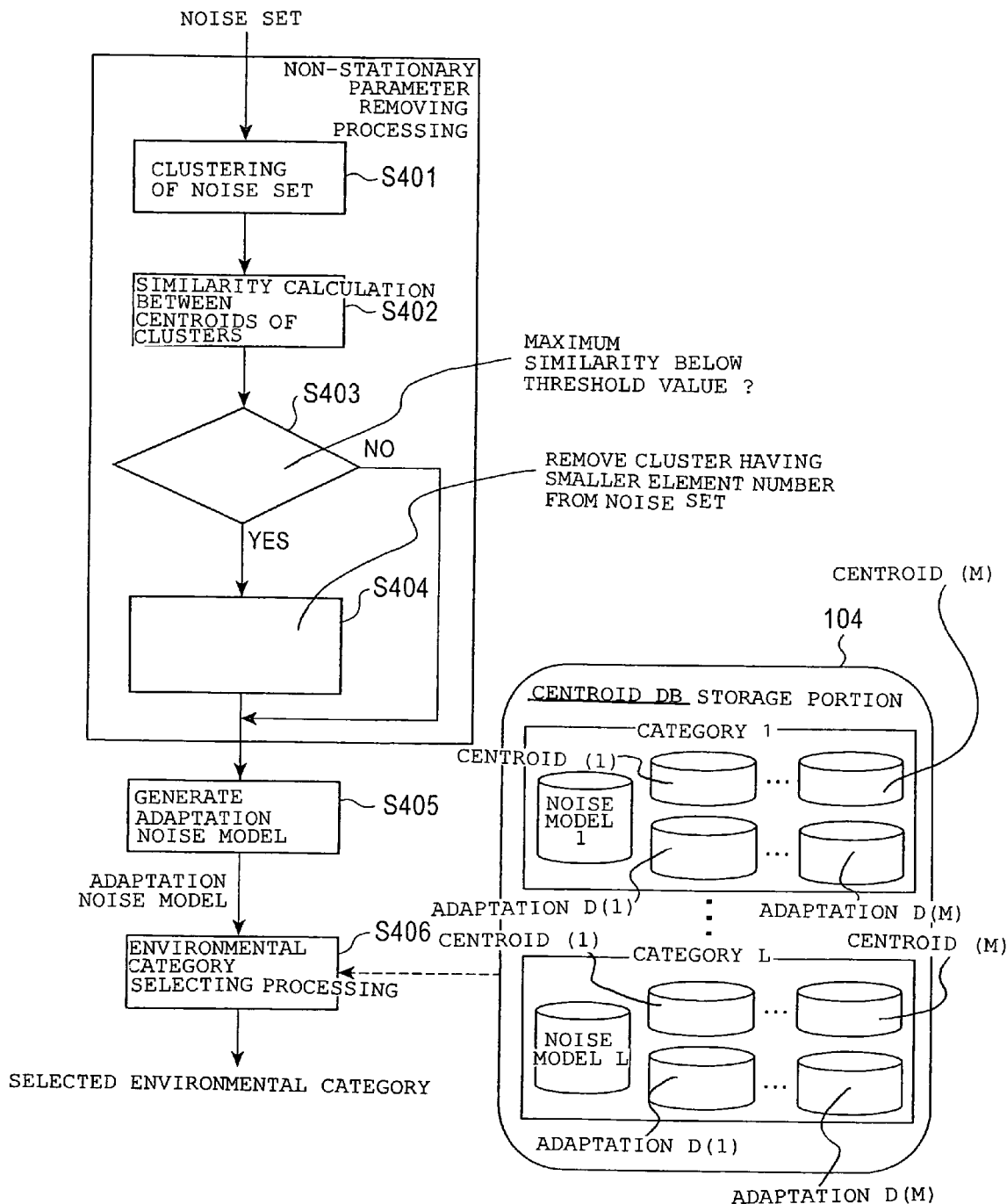
FIG. 8 is a flowchart showing an example of a non-stationary parameter removing processing.

FIG. 8 is a flowchart showing an example of the non-stationary parameter removing processing executed by the non-stationary parameter removing processor 111.

As not shown, the non-stationary parameter removing processor 111 executes the clustering processing of classifying one noise set input in step S401 to plural groups. Subsequently, the similarity in centroid between respective clusters is determined in step S402. Subsequently, it is judged in step S403 whether the lowest similarity in centroid between clusters is equal to a predetermined threshold value or less.

If the similarity is equal to the predetermined threshold value or less in step S403, the processing goes to step S404 to remove feature parameters belonging to a cluster having a smaller element number (indicating the number of feature parameters belonging to a set). Subsequently, the processing goes to step S405 to generate an adaptation noise model (corresponding to the environmental estimation processing of the step S303 of FIG. 6). On the other hand, if the similarly is larger than the predetermined threshold value in step S403, the processing of the step S404 is not executed, and the processing goes to step S405.

Subsequently to the execution of the step S405, the environmental category selecting processing (corresponding to the model selecting and extracting processing of the step S305 of FIG. 6) is executed in step S406.

Next, an applied example of the non-stationary parameter removing processing will be described.

Figure 9:
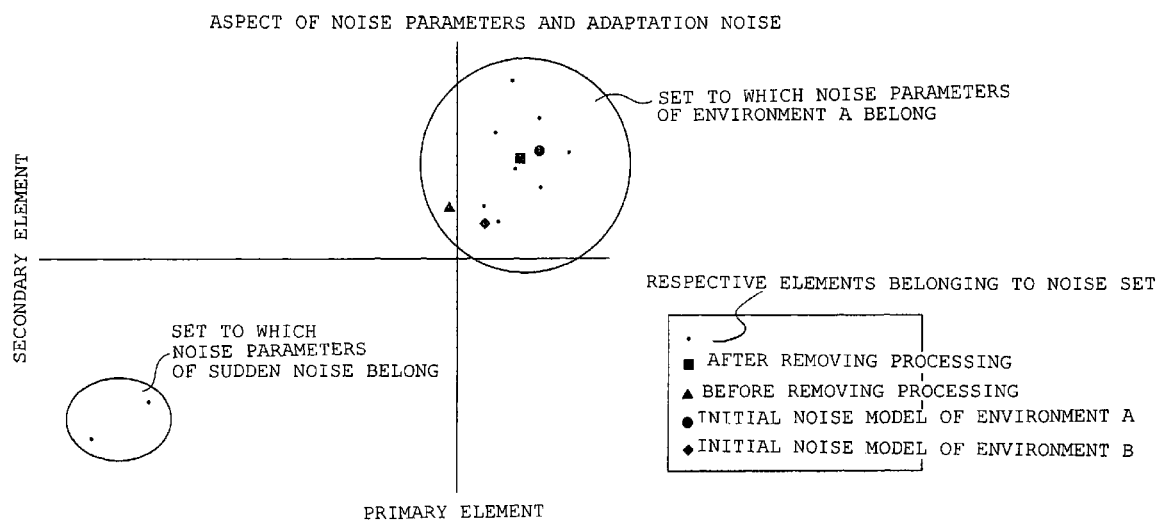
FIG. 9 is a diagram of noise parameters showing an applied example of the non-stationary parameter removing processing.

FIG. 9 shows a noise set in which noise parameters suffering an effect of sudden noises coexist in the noise parameters corresponding to an environment A.

When the non-stationary parameter removing processing is executed, the centroid to the whole set of noises is calculated, and the similarity between the centroid and the noise model representing each of the environment A and the environment B is calculated to thereby identify the environment. Therefore, because of the effect of the sudden noise, the similarity of the centroid of the noise set to the noise model of the environment B is higher than that to the noise model of the environment A, and thus the environment is erroneously identified as the environment B.

On the other hand, when the non-stationary parameter removing processing is executed like the second embodiment, the noise parameters identified as the sudden noises are removed, and the centroid of the noise parameters from which the noise parameters described above are removed is calculated. Accordingly, the similarity of the centroid thus calculated to the noise model of the environment A is higher, and thus the environmental category can be more properly selected.

As described above, the performance of the voice recognition can be enhanced by executing the non-stationary parameter removing processing.

In the first and second embodiments, when the environmental noise superposed on the uttered voice input does not correspond to a noise model prepared in advance, the environmental noise concerned may be accumulated in another storage medium such as HDD or the like for a predetermined period, and data such as the centroid value or the like may be calculated on the accumulated data. Accordingly, new noise categories in the centroid data base can be increased in conformity with the environments.

Furthermore, by providing communication means for communicating data with a server having a large scale of data base through a communication network, the memories of the centroid data base and the differential vector data base may be partially or wholly replaced by the data base of the server.

The invention claimed is:

1. A voice recognition device for executing noise adaptation processing based on a noise model on an input voice signal to carry out voice recognition on the input voice signal is characterized by comprising:
    first storage means for calculating a first parameter representative of plural noise models contained in each of plural noise environmental categories in advance and storing the first parameter for every noise environmental category;
    second storage means for calculating a second parameter representing relative positional information between each of the plural noise models and the first parameter in advance and storing the second parameter;
    estimating means for estimating, on the basis of the characteristic of an environmental noise superposed by the input voice signal, a noise environmental category to which the environmental noise concerned belongs;
    selecting means for selecting and extracting the first parameter corresponding to a noise environmental category estimated by the estimating means from the first storage means; and
    noise adaptation means for restoring a noise model adaptive to the environmental noise by using the first parameter extracted by the selecting means and the second parameter read out from the second storage means and executing noise adaptation processing on the input voice signal by using the noise model thus restored.

2. The voice recognition device according to claim 1, wherein the first parameter contains a centroid value associated with each noise model that is achieved by executing model composition processing on a centroid value achieved by executing clustering processing on an acoustic model and each of plural noise models contained in one noise environmental category, and data appended to the centroid value.

3. The voice recognition device according to claim 1, further comprising a non-stationary parameter removing processor for removing non-stationary parameters from a set of feature parameters of an environmental noise superposed on the input voice signal.

4. The voice recognition device according to claim 2, wherein the clustering processing is continued until the number of groups of acoustic models formed by the processing concerned reaches a predetermined group number.

5. The voice recognition device according to claim 2, wherein the second parameter is a differential vector between the centroid value and each of the plural noise models.

6. The voice recognition device according to claim 1, wherein the estimating means further comprises storing and adding means for extracting the first parameter from the environmental noise and adding and storing the first parameter to the first storage means when it is detected that the environmental noise does not corresponds to a noise environmental category prepared in advance.

7. The voice recognition device according to claim 1, further comprising communication means for relaying data between a server containing a data base and a memory contained in the first and second storage means, wherein the data base is used as a part or the whole of the memory.

8. A voice recognition method for executing noise adaptation processing based on a noise model on an input voice signal to carry out voice recognition on the input voice signal is characterized by comprising:

a step of calculating a first parameter representative of plural noise models contained in each of plural noise environmental categories in advance and storing the first parameter into a first memory for every noise environmental category;

a step of calculating a second parameter representing relative positional information between each of the plural noise models and the first parameter in advance and storing the second parameter into a second memory;

a step of estimating, on the basis of the characteristic of an environmental noise superposed by the input voice signal, a noise environmental category to which the environmental noise concerned belongs;

a step of selecting and extracting the first parameter corresponding to an estimated noise environmental category from the first memory ; and a step of restoring a noise model adaptive to the environmental noise by using the selected and extracted first parameter and the second parameter read out from the second memory and executing noise adaptation processing on the input voice signal by using the noise model thus restored.

9. The voice recognition method according to claim 8, further comprising a step of removing non-stationary parameters from a set of feature parameters of an environmental noise superposed on the input voice signal.

* * * * *